(12) United States Patent
Kirkby et al.

(10) Patent No.: US 12,438,053 B2
(45) Date of Patent: Oct. 7, 2025

(54) ULTRASOUND VIBRATING-TYPE DEFECT DETECTION APPARATUS AND WIRE DEFECT DETECTION SYSTEM

(71) Applicant: Yamaha Robotics Holdings Co., Ltd., Tokyo (JP)

(72) Inventors: Michael Kirkby, Tokyo (JP); Hiroshi Munakata, Tokyo (JP); Takuya Adachi, Tokyo (JP)

(73) Assignee: Yamaha Robotics Holdings Co., Ltd., Tokyo (JP)

( * ) Notice: Subject to any disclaimer, the term of this patent is extended or adjusted under 35 U.S.C. 154(b) by 466 days.

(21) Appl. No.: 18/015,074

(22) PCT Filed: Oct. 28, 2020

(86) PCT No.: PCT/JP2020/040416
§ 371 (c)(1),
(2) Date: Jan. 8, 2023

(87) PCT Pub. No.: WO2022/091247
PCT Pub. Date: May 5, 2022

(65) Prior Publication Data
US 2023/0253266 A1    Aug. 10, 2023

(51) Int. Cl.
*G01N 21/84* (2006.01)
*B06B 1/02* (2006.01)
(Continued)

(52) U.S. Cl.
CPC ............ *H01L 22/12* (2013.01); *B06B 1/0284* (2013.01); *G01N 21/8806* (2013.01);
(Continued)

(58) Field of Classification Search
CPC ............... H01L 22/12; H01L 21/60; H01L 2224/48091; H01L 2224/48145;
(Continued)

(56) References Cited

U.S. PATENT DOCUMENTS 9,360,418 B2    6/2016  Georgeson
10,830,710 B2   11/2020 Seto
(Continued)

FOREIGN PATENT DOCUMENTS

JP    H09182467    7/1997
JP    H09213752    8/1997
(Continued)

OTHER PUBLICATIONS

"International Search Report (Form PCT/ISA/210) of PCT/JP2020/040416", mailed on Dec. 22, 2020, with English translation thereof, pp. 1-6.

(Continued)

*Primary Examiner* — Tarun Sinha
(74) *Attorney, Agent, or Firm* — JCIPRNET

(57) ABSTRACT

An ultrasound vibrating-type defect detection apparatus (100) for detecting a defect in a semiconductor apparatus (10) is provided with: an ultrasound vibrator (42); a high-frequency power supply (40); a camera (45); and a controller (50) for adjusting the frequency of high-frequency power supplied from the high-frequency power supply (40) to the ultrasound vibrator (42), and for performing detection of a defect in the semiconductor apparatus (10). The controller (50) causes the camera (45) to capture an image of the semiconductor apparatus (10) while varying the frequency of high-frequency power supplied from the high-frequency power supply (40) to the ultrasound vibrator (42), and performs detection of a defect in the semiconductor apparatus (10) on the basis of the captured image.

14 Claims, 11 Drawing Sheets

(51) Int. Cl.
*G01N 21/88* (2006.01)
*H01L 21/66* (2006.01)

(52) U.S. Cl.
CPC . *G01N 21/8851* (2013.01); *G01N 2021/8864* (2013.01); *G01N 2021/8896* (2013.01)

(58) Field of Classification Search
CPC ... H01L 24/48; H01L 24/78; H01L 2224/789; H01L 2224/859; B06B 1/0284; B06B 2201/55; B06B 2201/72; B06B 1/0253; G01N 21/8806; G01N 21/8851; G01N 2021/8864; G01N 2021/8896; G01N 19/08; G01N 29/2418; G01N 2203/0055; G01N 29/0654; G01N 2203/0008; G01N 2203/005; G01N 2203/0062; G01N 2203/028; G01N 2203/0647
See application file for complete search history.

(56) References Cited

U.S. PATENT DOCUMENTS

| | | | |
|---|---|---|---|
| 2004/0089812 A1* | 5/2004 | Favro | G01N 21/71 |
| | | | 250/341.6 |
| 2010/0051670 A1 | 3/2010 | Okafuji | |
| 2012/0179391 A1 | 7/2012 | Omori et al. | |
| 2016/0018324 A1* | 1/2016 | Georgeson | G01N 29/2431 |
| | | | 250/341.6 |

FOREIGN PATENT DOCUMENTS

| | | |
|---|---|---|
| JP | 2007203199 | 8/2007 |
| JP | 2008084881 | 4/2008 |
| JP | 2010056106 | 3/2010 |
| JP | 2012083246 | 4/2012 |
| JP | 2014024065 | 2/2014 |
| JP | 2016024186 | 2/2016 |
| JP | 2020134289 | 8/2020 |
| WO | 2011036751 | 3/2011 |

OTHER PUBLICATIONS

"Office Action of Taiwan Counterpart Application", issued on Aug. 16, 2022, with partial English translation thereof, p. 1-p. 10.

* cited by examiner

ULTRASOUND VIBRATING-TYPE DEFECT DETECTION APPARATUS AND WIRE DEFECT DETECTION SYSTEM

CROSS-REFERENCE TO RELATED APPLICATION

This application is a 371 application of the International PCT application serial no. PCT/JP2020/040416, filed on Oct. 28, 2020. The entirety of the above-mentioned patent application is hereby incorporated by reference herein and made a part of this specification.

TECHNICAL FIELD

The present invention relates to a structure of an ultrasound vibrating-type defect detection apparatus that detects a defect in an inspection object by ultrasonically vibrating the inspection object.

RELATED ART

Many wire bonding apparatuses are used to connect between electrodes of a substrate and electrodes of a semiconductor chip with wires. The wire bonding apparatuses employ a method of detecting connection defects between the electrodes of the semiconductor chip and the wires by an electrical means that is to apply a current between the wires and the semiconductor chip (see Patent Literature 1, for example).

The wire bonding apparatuses also employ a method of detecting defects in connection between the electrodes of the semiconductor chip and the wires by a mechanical means that is to detect displacement in the Z direction from the landing of a capillary to the end of bonding (see Patent Literature 2, for example).

CITATION LIST

Patent Literatures

[Patent Literature 1] Japanese Patent Laid-Open No. 9-213752
[Patent Literature 2] Japanese Patent Laid-Open No. 2010-56106

SUMMARY OF INVENTION

Technical Problem

In recent years, there has been a demand for higher precision in detecting defects in an inspection object such as wires. However, the defect detection carried out by the electrical means or mechanical means described in Patent Literatures 1 and 2 may cause erroneous detection.

In addition, it is required to detect defects in all the wires connecting the electrodes of the semiconductor chip and the electrodes of the substrate. However, in the defect detection methods described in Patent Literatures 1 and 2, the defect detection is performed for each wire. Therefore, there is a problem that for semiconductor chips having more than 100 wires connecting one semiconductor chip and the substrate, for example, the inspection may take a long time.

Thus, an object of the present invention is to detect a defect in an inspection object with high accuracy in a short time.

Solution to Problem

An ultrasound vibrating-type defect detection apparatus according to the present invention is provided for detecting a defect in an inspection object. The ultrasound vibrating-type defect detection apparatus includes: an ultrasound vibrating device ultrasonically vibrating the inspection object; a power supply supplying high-frequency power to the ultrasound vibrating device; an imaging device imaging the inspection object ultrasonically vibrated; and a controller adjusting a frequency of the high-frequency power supplied from the power supply to the ultrasound vibrating device, and performing detection of a defect in the inspection object. The controller captures an image of the inspection object with the imaging device while varying the frequency of the high-frequency power supplied from the power supply to the ultrasound vibrating device, and performs detection of a defect in the inspection object based on the image captured.

Since the frequency of the high-frequency power supplied from the power supply to the ultrasound vibrating device is varied in this way, the inspection object can be ultrasonically vibrated at various frequencies, and a defect in the inspection object can be detected with high accuracy.

In the ultrasound vibrating-type defect detection apparatus according to the present invention, the inspection object may include a target portion subjected to detection of a defect, and a non-target portion not subjected to detection of a defect, and the controller may adjust a voltage of the high-frequency power supplied from the power supply to the ultrasound vibrating device so that a ratio of an amplitude of the target portion detected from the image captured by the imaging device to an amplitude of the non-target portion detected from the image captured by the imaging device is equal to or greater than a predetermined value when varying the frequency of the high-frequency power supplied from the power supply to the ultrasound vibrating device.

As a result, when ultrasonically vibrating the inspection object, the amplitude of the target portion becomes larger than the amplitude of the non-target portion, and a defect in the target portion of the inspection object can be detected with high accuracy.

The ultrasound vibrating-type defect detection apparatus according to the present invention may include a current sensor detecting a current of the high-frequency power supplied from the power supply to the ultrasound vibrating device, and the controller may adjust the voltage of the high-frequency power supplied from the power supply to the ultrasound vibrating device so that the current detected by the current sensor is within a predetermined range when varying the frequency of the high-frequency power supplied from the power supply to the ultrasound vibrating device.

The ultrasound vibrating device has a frequency at which it resonates. Therefore, when high-frequency power at the resonance frequency is input to the ultrasound vibrating device during ultrasonic vibration, the resonance lowers the impedance of the ultrasound vibrating device, increases the amplitude of the ultrasound vibrating device, and greatly vibrates the entire inspection object. As a result, the amplitude of the target portion may be hidden by the amplitude of the non-target portion and may not be detected. Since the amplitude of the ultrasound vibrating device is proportional to the current of the high-frequency power input to the ultrasound vibrating device, by detecting the current of the high-frequency power input to the ultrasound vibrating device with the current sensor and adjusting the voltage of the high-frequency power to keep the detected current within a predetermined range, the current of the high-frequency power can be kept within a predetermined range and the amplitude of the ultrasound vibrating device can be kept within a predetermined range. As a result, when ultrasonically vibrating the inspection object, it is possible to prevent the entire inspection object from vibrating greatly and prevent the amplitude of the target portion from being hidden by the amplitude of the non-target portion and becoming undetectable, and it is possible to detect a defect in the target portion of the inspection object with high accuracy.

In the ultrasound vibrating-type defect detection apparatus according to the present invention, the controller may include a map prescribing a variation of the voltage of the high-frequency power supplied from the power supply to the ultrasound vibrating device with respect to the frequency of the high-frequency power supplied from the power supply to the ultrasound vibrating device so that a current of the high-frequency power supplied from the power supply to the ultrasound vibrating device is within a predetermined range, and adjust the voltage of the high-frequency power supplied from the power supply to the ultrasound vibrating device based on the map when varying the frequency of the high-frequency power supplied from the power supply to the ultrasound vibrating device.

As a result, it is not necessary to adjust the voltage of the high-frequency power by feeding back the current detected by the current sensor, and when ultrasonically vibrating the inspection object, it is possible to prevent the entire inspection object from vibrating greatly and prevent the amplitude of the target portion from being hidden by the amplitude of the non-target portion and becoming undetectable with a simple configuration, and it is possible to detect a defect in the target portion of the inspection object with high accuracy.

In the ultrasound vibrating-type defect detection apparatus according to the present invention, the inspection object may be a semiconductor apparatus including a substrate, a semiconductor element attached to the substrate, and a wire connecting an electrode of the semiconductor element and an electrode of the substrate, or one electrode of the semiconductor element and another electrode of the semiconductor element, and the controller may adjust the voltage of the high-frequency power supplied from the power supply to the ultrasound vibrating device so that a ratio of an amplitude of the wire detected from the image captured by the imaging device to amplitudes of the substrate and the semiconductor element detected from the image captured by the imaging device is equal to or greater than a predetermined value when varying the frequency of the high-frequency power supplied from the power supply to the ultrasound vibrating device.

As a result, when ultrasonically vibrating the substrate and the semiconductor element, the amplitude of the wire becomes larger than the amplitudes of the substrate and the semiconductor element, and a defect in the target portion of the inspection object can be detected with high accuracy.

In the ultrasound vibrating-type defect detection apparatus according to the present invention, the controller may adjust the voltage of the high-frequency power supplied from the power supply to the ultrasound vibrating device so that the amplitude of the wire detected does not exceed a predetermined upper limit amplitude.

As a result, excessive vibration of the wire when ultrasonically vibrating the semiconductor apparatus can be suppressed.

In the ultrasound vibrating-type defect detection apparatus according to the present invention, the controller may capture a video of the semiconductor apparatus with the imaging device while varying the frequency of the high-frequency power supplied from the power supply to the ultrasound vibrating device, calculate a difference between images of the wire in one frame of the video captured and a previous frame before the one frame, and output a defect detection signal of the wire in response to the difference exceeding a predetermined threshold.

As a result, a defect in the wire can be detected from the amplitude of the wire.

In the ultrasound vibrating-type defect detection apparatus according to the present invention, the controller may calculate the difference by varying the number of frames between one frame and the previous frame for calculating the difference, or a frame rate of the video.

As a result, it is possible to detect the difference between the images of the wire even when the vibration frequency of the wire varies, and to improve the defect detection accuracy.

In the ultrasound vibrating-type defect detection apparatus according to the present invention, the ultrasound vibrating device may be an ultrasound vibrator connected to the inspection object to ultrasonically vibrate the inspection object, or an ultrasound speaker arranged in a periphery of the inspection object.

As a result, it is possible to detect a defect in the inspection object with a simple configuration.

A wire defect detection system according to the present invention is provided for detecting a defect in a wire of a semiconductor apparatus, which includes a substrate, a semiconductor element attached to the substrate, and the wire connecting an electrode of the semiconductor element and an electrode of the substrate, or one electrode of the semiconductor element and another electrode of the semiconductor element. The wire defect detection system includes: an ultrasound vibrating device ultrasonically vibrating the semiconductor apparatus; a power supply supplying high-frequency power to the ultrasound vibrating device; an imaging device imaging the semiconductor apparatus ultrasonically vibrated; a display displaying an image captured by the imaging device; and a controller adjusting a frequency of the high-frequency power supplied from the power supply to the ultrasound vibrating device and performing detection of a defect in the wire. The controller captures a video of the semiconductor apparatus with the imaging device while varying the frequency of the high-frequency power supplied from the power supply to the ultrasound vibrating device, calculates a difference between images in one frame of the video captured and a previous frame before the one frame, and displays a display image of the wire on the display by differentiating the display image from other display images of the wire in response to the difference exceeding a predetermined threshold.

Since the display image of the wire is made different from other display images of the wire in this way in response to the difference exceeding a predetermined threshold, a defect in the wire can be easily detected by the display on the display.

Effects of Invention

The present invention can detect a defect in an inspection object with high accuracy in a short time.

DESCRIPTION OF EMBODIMENTS

Hereinafter, an ultrasound vibrating-type defect detection apparatus 100 according to an embodiment will be described with reference to the drawings. In the following description, the ultrasound vibrating-type defect detection apparatus 100 detects a defect in a wire 30 of a semiconductor apparatus 10 which is an inspection object, but the ultrasound vibrating-type defect detection apparatus 100 can also be used to detect a defect in other inspection objects.

Figure 1:
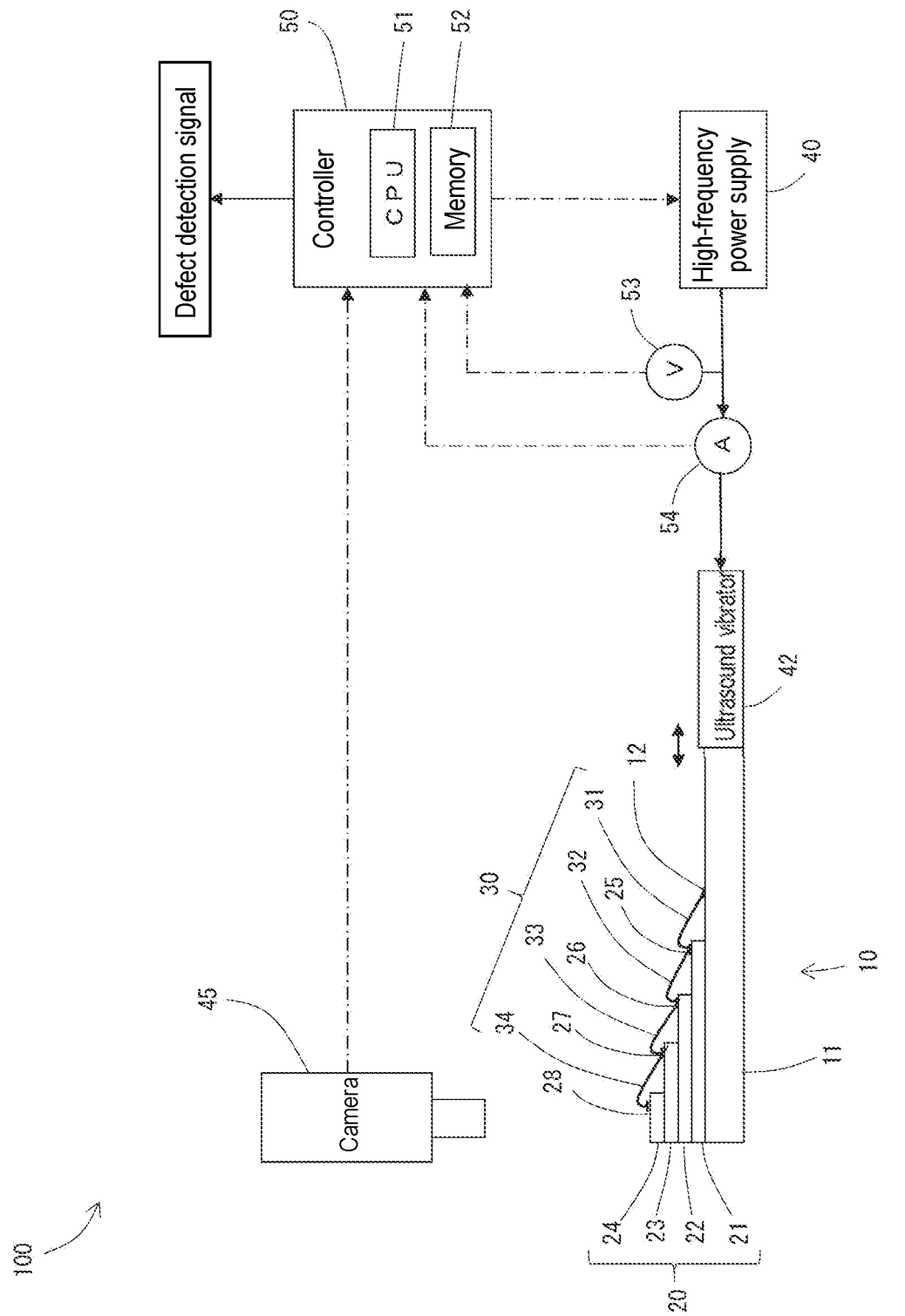
FIG. 1 is a system diagram showing a configuration of the ultrasound vibrating-type defect detection apparatus according to an embodiment.

As shown in FIG. 1, the ultrasound vibrating-type defect detection apparatus 100 includes an ultrasound vibrator 42 which is an ultrasound vibrating device, a high-frequency power supply 40, a camera 45 which is an imaging device, and a controller 50.

As shown in FIG. 1, the semiconductor apparatus 10 to be inspected by the ultrasound vibrating-type defect detection apparatus 100 has semiconductor chips 21 to 24 stacked in four stages and attached onto a substrate 11, and electrodes 25 to 28 of the semiconductor chips 21 to 24 and an electrode 12 of the substrate 11 are continuously connected by one wire 30. Here, the semiconductor chips 21 to 24 constitute a semiconductor element 20. The one wire 30 is composed of a first-stage wire 31 that connects the electrode 25 of the semiconductor chip 21 in the first stage and the electrode 12 of the substrate 11, and second-stage to fourth-stage wires 32 to 34 that respectively connect the electrodes 26 to 28 of the semiconductor chips 22 to 24 in the second to fourth stages and the electrodes 25 to 27 of the semiconductor chips 21 to 23 in the first to third stages. The substrate 11 and the semiconductor chips 21 to 24 of the semiconductor apparatus 10 constitute non-target portions that are not subjected to defect detection, and the wire constitutes a target portion that is subjected to defect detection.

The high-frequency power supply 40 outputs AC power having a frequency in the ultrasonic range and ultrasonically vibrates the ultrasound vibrator 42. The ultrasound vibrator 42 is a member that is driven by high-frequency power in the ultrasonic frequency range input from the high-frequency power supply 40 and vibrates ultrasonically. For example, the ultrasound vibrator 42 may be composed of a piezo element or the like. The ultrasound vibrator 42 is connected to the substrate 11 of the semiconductor apparatus 10 and ultrasonically vibrates the substrate 11.

Between the high-frequency power supply 40 and the ultrasound vibrator 42, a voltage sensor 53 for detecting the voltage of the high-frequency power supplied from the high-frequency power supply 40 to the ultrasound vibrator 42 and a current sensor 54 for detecting the current of the high-frequency power are attached.

Figure 2:
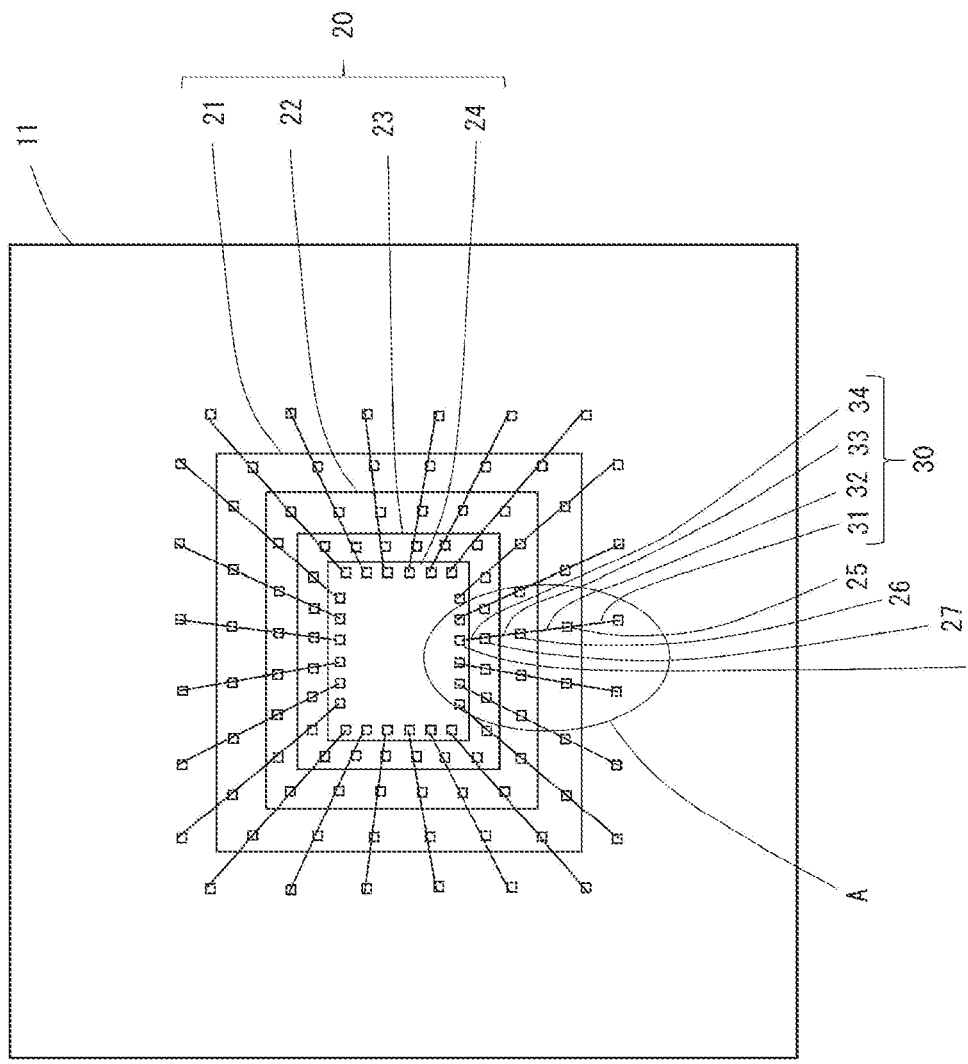
FIG. 2 is a view showing an image of the semiconductor apparatus captured from above by the camera of the ultrasound vibrating-type defect detection apparatus shown in FIG. 1.

The camera 45 is arranged above the semiconductor apparatus 10, and as shown in FIG. 2, captures images of the substrate 11, the semiconductor chips 21 to 24 attached to the substrate 11, the electrodes 25 to 28 arranged in the outer peripheral portion of the semiconductor chips 21 to 24, the electrode 12 of the substrate 11 arranged in the periphery of the semiconductor chip 21 in the first stage, and each wire 30 continuously connecting the electrodes 12 and 25 to 28.

The controller 50 is a computer including a CPU 51 and a memory 52 therein. The high-frequency power supply 40 is connected to the controller 50 and operates according to commands from the controller 50. The camera 45 is connected to the controller 50 and operates according to commands from the controller 50. A video captured by the camera 45 is input to the controller 50. The voltage sensor 53 and the current sensor 54 are connected to the controller 50, and data of the voltage and current of the high-frequency power detected by the voltage sensor 53 and the current sensor 54 are input to the controller 50. The controller 50 captures an image of the semiconductor apparatus 10 captured by the camera 45 while varying the frequency of the high-frequency power supplied from the high-frequency power supply 40 to the ultrasound vibrator 42, and inspects for a defect in the semiconductor apparatus 10 based on the captured image.

Next, variations of the impedance and the current A0 with respect to the frequency f when the voltage V0 of the high-frequency power supplied from the high-frequency power supply to the ultrasound vibrator 42 is kept constant as in the conventional art will be described with reference to FIG. 3.

Figure 3:
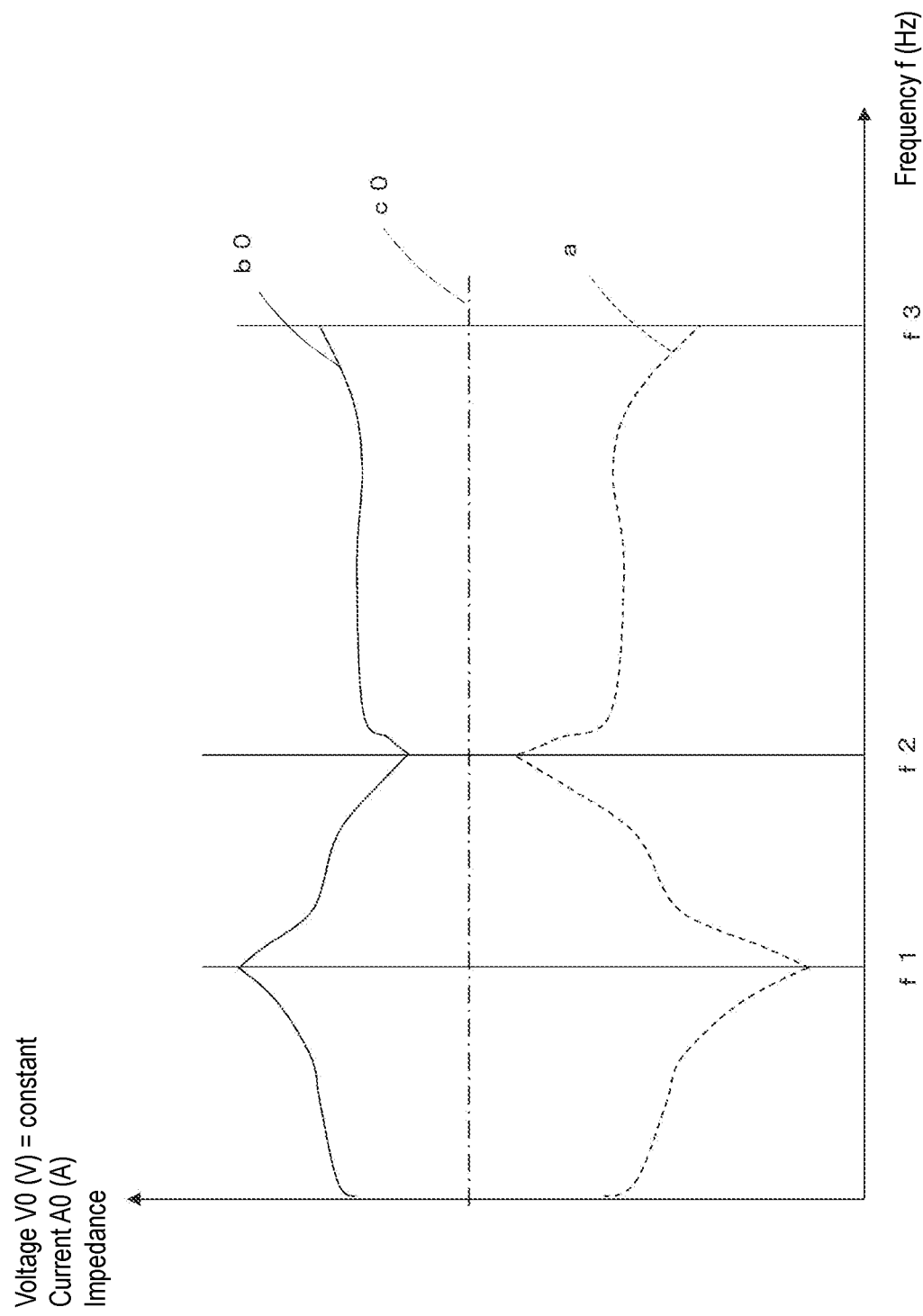
FIG. 3 is a diagram showing a variation of the impedance of the ultrasound vibrator and a variation of the current of the high-frequency power with respect to the frequency of the high-frequency power when the voltage of the high-frequency power supplied by the ultrasound vibrator in the conventional art is constant.

As indicated by the one-dot chain line c0 shown in FIG. 3, when the voltage V0 of the high-frequency power supplied from the high-frequency power supply 40 to the ultrasound vibrator 42 is kept constant and the frequency f of the high-frequency power is varied, the ultrasound vibrator 42 itself resonates at the frequency f1. Thus, the impedance of the ultrasound vibrator 42 drops significantly at the frequency f1 as indicated by the dashed line a in FIG. 3. On the other hand, at the frequency f2 between the frequency f1 and the maximum frequency f3, the impedance of the ultrasound vibrator 42 rises significantly.

When the impedance of the ultrasound vibrator 42 drops significantly in the vicinity of the frequency f1 as indicated by the dashed line a in FIG. 3, as indicated by the solid line b0 in FIG. 3, the current A0 of the high-frequency power supplied to the ultrasound vibrator 42 rises significantly. Conversely, when the impedance of the ultrasound vibrator 42 rises significantly in the vicinity of the frequency f2, the current A0 of the high-frequency power supplied to the ultrasound vibrator 42 drops significantly. The magnitude of the current A0 supplied to the ultrasound vibrator 42 is proportional to the amplitude of the ultrasound vibrator 42. Therefore, in the vicinity of the frequency f1 at which the ultrasound vibrator 42 resonates, the amplitude of the ultrasound vibrator 42 rises significantly and the amplitude of the substrate 11 increases significantly, and in the vicinity of the frequency f2, the amplitude of the ultrasound vibrator 42 drops significantly and the amplitude of the substrate 11 decreases significantly.

Therefore, at the frequency f1 at which the ultrasound vibrator 42 resonates, the substrate 11, the semiconductor chips 21 to 24, and the wire 30 all vibrate greatly, so the amplitude of the wire 30 may be hidden by the amplitudes of the substrate 11 and the semiconductor chips 21 to 24, making it difficult to detect.

Conversely, at the frequency f2, the amplitudes of the substrate 11, the semiconductor chips 21 to 24, and the wire 30 become so small that the amplitude of the wire 30 may not be detected.

As described above, when the frequency is varied while the voltage V0 supplied from the high-frequency power supply 40 to the ultrasound vibrator 42 is kept constant, as in the conventional art, it may be difficult to detect the amplitude of the wire 30 in the vicinity of the frequency f1 at which the ultrasound vibrator 42 resonates.

Therefore, in the ultrasound vibrating-type defect detection apparatus 100 according to the embodiment, considering that the amplitude of the ultrasound vibrator 42 is proportional to the current of the high-frequency power input to the ultrasound vibrating device, the current sensor 54 detects the current A1 of the high-frequency power input to the ultrasound vibrator 42, and the voltage V1 of the high-frequency power is adjusted so that the detected current A1 is within a predetermined range. As a result, the current A1 of the high-frequency power can be kept within a predetermined range, and the amplitude of the ultrasound vibrator 42 can be kept within a predetermined range. Then, when the frequency of the high-frequency power is varied to ultrasonically vibrate the semiconductor apparatus 10, it is possible to prevent the amplitudes of the substrate 11 and the semiconductor element 20, which are the non-target portions for detection, from vibrating greatly at a specific frequency, and prevent the amplitude of the wire 30, which is the target portion for detection, from being hidden by the amplitudes of the substrate 11 and the semiconductor element 20 and becoming undetectable.

Hereinafter, a variation of the voltage V1 and a variation operation of the current A1 of the high-frequency power when the voltage V1 of the high-frequency power supplied to the ultrasound vibrator 42 is varied to keep the current A1 detected by the current sensor 54 constant in the ultrasound vibrating-type defect detection apparatus 100 of the embodiment will be described with reference to FIG. 4.

Figure 4:
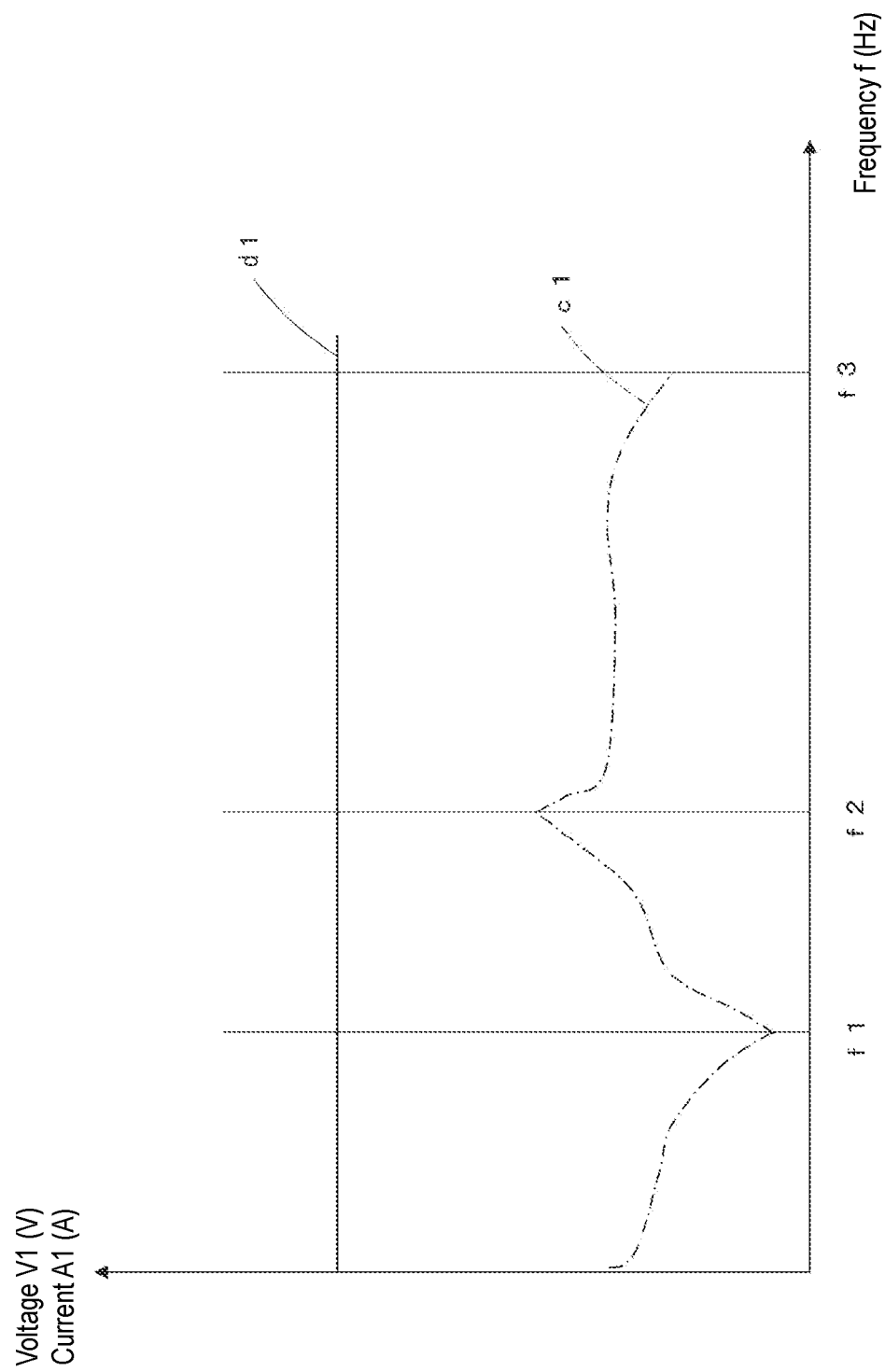
FIG. 4 is a diagram showing a variation of the voltage and a variation of the current of the high-frequency power when the voltage of the high-frequency power supplied to the ultrasound vibrator is varied to keep the current detected by the current sensor constant in the ultrasound vibrating-type defect detection apparatus according to an embodiment.

In the ultrasound vibrating-type defect detection apparatus 100 according to the embodiment, the current A1 detected by the current sensor 54 is fed back to the controller 50, and in the vicinity of the frequency f1 at which the current A1 of the high-frequency power increases, the voltage V1 of the high-frequency power supplied to the ultrasound vibrator 42 is lowered as indicated by the one-dot chain line c1 in FIG. 4. On the other hand, in the vicinity of the frequency f2 at which the current A1 detected by the current sensor 54 decreases, the voltage V1 of the high-frequency power supplied to the ultrasound vibrator 42 is raised as indicated by the one-dot chain line c1 in FIG. 4. Thereby, as indicated by the solid line d1 in FIG. 4, the magnitude of the current A1 detected by the current sensor 54 can be kept substantially constant regardless of the frequency f.

By performing feedback control in this way to keep the current A1 of the high-frequency power supplied from the high-frequency power supply 40 to the ultrasound vibrator 42 substantially constant, even if the frequency f of the high-frequency power is varied, the amplitude of the ultrasound vibrator 42 can be kept substantially constant, and the amplitudes of the substrate 11 and the semiconductor element 20 can be kept substantially constant.

Then, at this time, the voltage may be adjusted so that the ratio of the amplitude of the wire 30 detected from the image captured by the camera 45 to the amplitudes of the substrate 11 and the semiconductor element 20 detected from the image captured by the camera 45 is equal to or greater than a predetermined value. In this way, the amplitude of the wire 30 can be prevented from being mixed with the amplitude of the substrate 11 or the semiconductor element 20 at each frequency f, which reduces the detection accuracy, and the amplitude of the wire 30 can be reliably detected and a defect in the wire 30 can be detected with high accuracy. Further, at this time, by adjusting the voltage of the high-frequency power to keep the amplitude of the wire 30 from exceeding an upper limit amplitude while checking the image of the wire 30 captured by the camera 45, the wire 30 can be prevented from being damaged due to excessive vibration during defect detection.

Next, an operation of detecting a defect in the wire 30 in the ultrasound vibrating-type defect detection apparatus 100 of the embodiment will be described with reference to FIG. 5 and FIG. 6.

Figure 5:
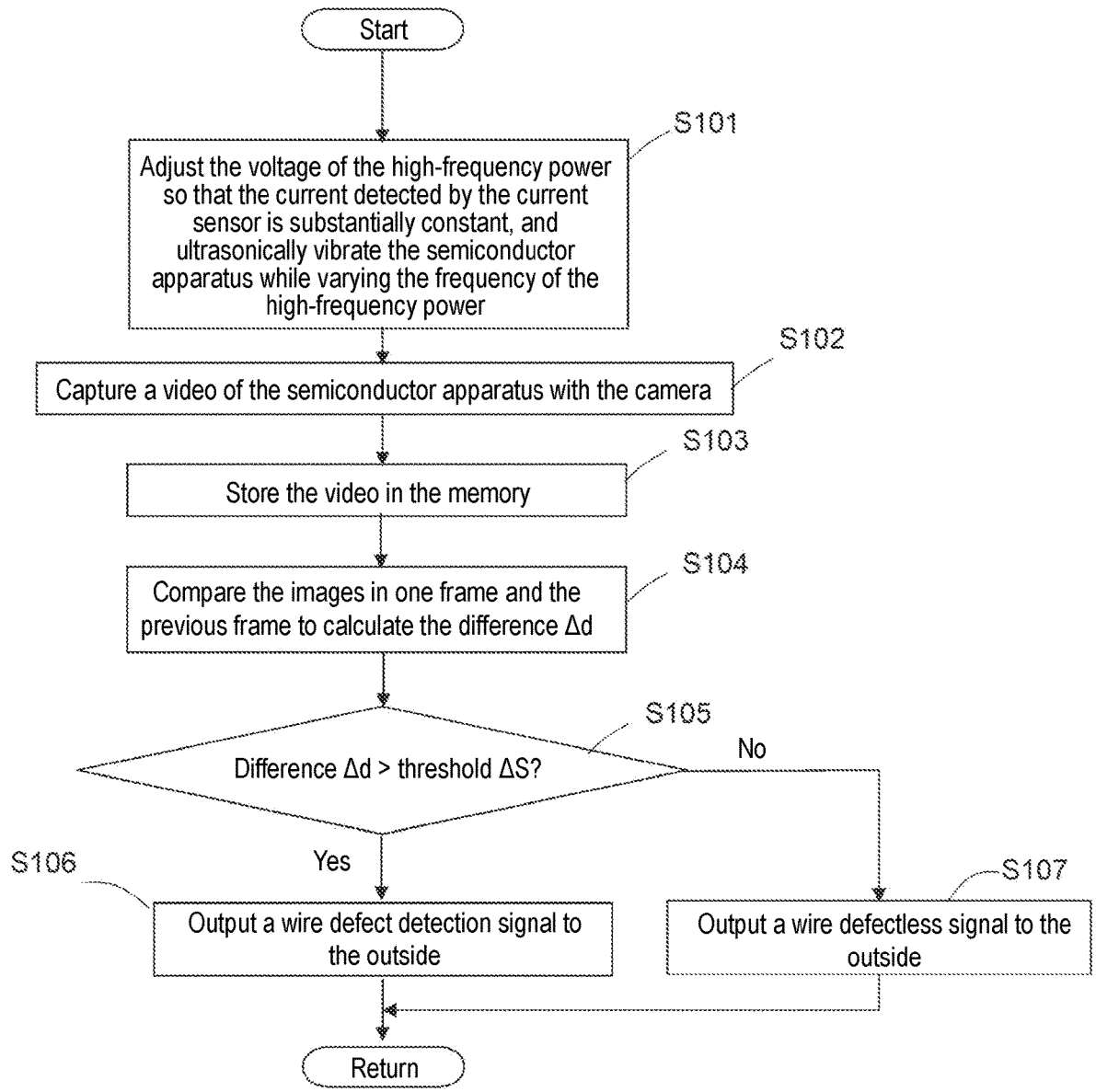
FIG. 5 is a flowchart showing an operation of the ultrasound vibrating-type defect detection apparatus shown in FIG. 1.

As shown in step S101 of FIG. 5, the CPU 51 of the controller 50 adjusts the voltage V1 of the high-frequency power so that the current A1 detected by the current sensor 54 is substantially constant, and ultrasonically vibrates the semiconductor apparatus 10 while varying the frequency f of the high-frequency power.

The controller 50 captures a video of the vibrating semiconductor apparatus 10 as shown in step S102 of FIG. 5, and stores the captured image data in the memory 52 as shown in step S103 of FIG. 5.

When the CPU 51 of the controller 50 varies the frequency of the high-frequency power within a predetermined ultrasonic frequency range, captures a video of the semiconductor apparatus 10, and stores the video in the memory 52, the CPU 51 proceeds to step S104 of FIG. 5 and compares the images of the wire 30 in one frame and the previous frame to calculate a positional difference Δd.

Figure 6:
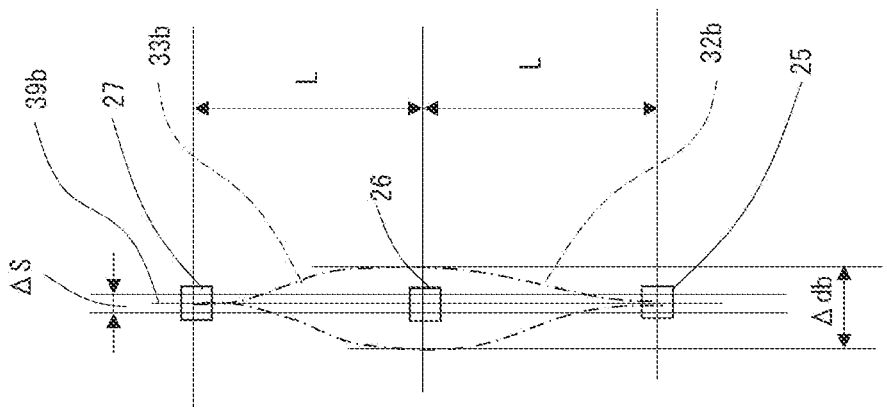
FIG. 6 is an enlarged plan view of the part A in FIG. 2 and an enlarged plan view of the part B shown in FIG. 6 when the substrate is ultrasonically vibrated.
Figure 6:
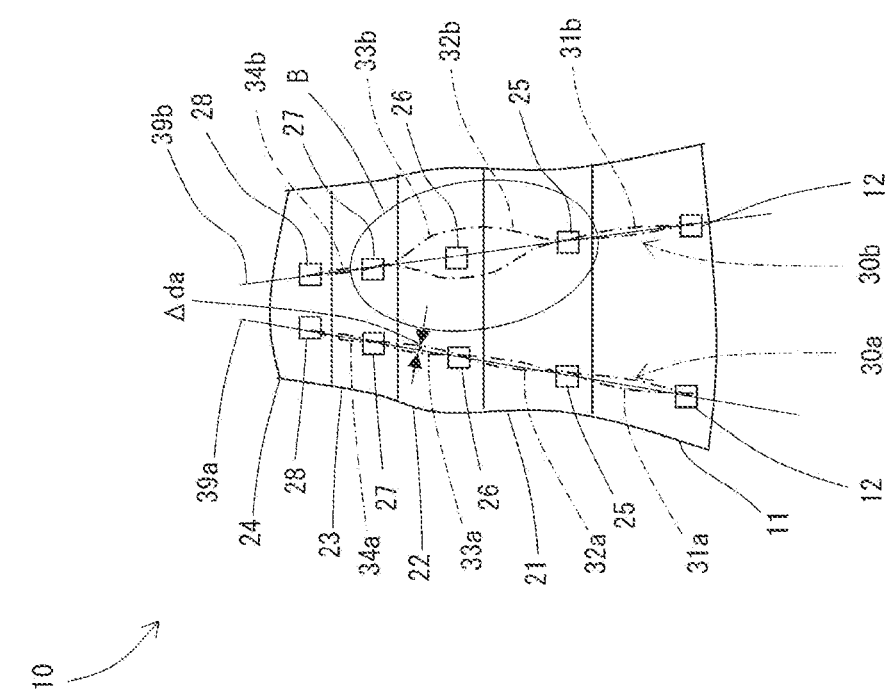

A wire 30a shown in the detail of the part A in FIG. 6 is normally connected to each of the electrodes 12 and 25 to 28. When the wire 30a is ultrasonically vibrated, the first-stage to fourth-stage wires 31a to 34a vibrate in the lateral direction at the natural frequency g0 respectively between the electrodes 12 and 25 to 27 to which the lower ends of the first-stage to fourth-stage wires 31a to 34a are respectively connected and the electrodes 25 to 28 to which the upper ends are connected. The natural frequency g0 varies depending on the diameter of the wire 30 and the distance L between the electrodes 25 and 26 and between the electrodes 26 and 27, but is often on the order of several tens of Hz in a general semiconductor apparatus 10.

On the other hand, a defective wire 30b is not attached to the electrode 26 of the semiconductor chip 22 in the second stage. Therefore, when the defective wire 30b is ultrasonically vibrated, the second-stage wire 32b and the third-stage wire 33b vibrate in the lateral direction at the natural frequency g1 between the electrode 25 of the semiconductor chip 21 in the first stage and the electrode 27 of the semiconductor chip 23 in the third stage. In this example, as shown in the detail of the part B in FIG. 6, since the distance L between the electrode 25 and the electrode 27 is 2 L which is twice the distance L between the electrodes 25 and 26 and between the electrodes 26 and 27, the natural frequency g1 of the second-stage wire 32b and the third-stage wire 33b of the defective wire 30b is about ½ of g0, and is often on the order of 20 to 30 Hz in a general semiconductor apparatus 10.

The first-stage to fourth-stage wires 31a to 34a of the normally connected wire 30a vibrate in the lateral direction at the natural frequency g0 of several tens of Hz. The frame rate of the videos is 24 to 60 frames per second. Therefore, for example, the image of the first-stage to fourth-stage wires 31a to 34a in one frame is as indicated by the one-dot chain line on the left side of the center line 39a of the wire 30a in the detail of the part A in FIG. 6, and the image of the previous frame is as indicated by the one-dot chain line on the right side of the center line 39a of the wire 30a in the detail of the part A in FIG. 6.

In step S104 of FIG. 5, the CPU 51 of the controller 50 compares the image of the first-stage to fourth-stage wires 31a to 34a in one frame shown in the detail of the part A in FIG. 6 with the image of the first-stage to fourth-stage wires 31a to 34a in the previous frame, and calculates a difference Δda therebetween. As shown in the detail of the part A in FIG. 6, this difference Δda is small in the normal wire 30a. This difference Δda is proportional to the amplitudes of the first-stage to fourth-stage wires 31a to 34a.

On the other hand, the second-stage wire 32b and the third-stage wire 33b of the defective wire 30b, which is not attached to the electrode 26 of the semiconductor chip 22 in the second stage, vibrate greatly in the lateral direction at 20 to 30 Hz. As mentioned earlier, the frame rate of the videos is 24 to 60 frames per second, so for example, the image of the second-stage wire 32b and the third-stage wire 33b in one frame is as indicated by the one-dot chain line on the left side of the center line 39b of the defective wire 30b in the details of the part A and the part B in FIG. 6, and the image of the previous frame is as indicated by the one-dot chain line on the right side of the center line 39b of the wire 30b in the details of the part A and the part B in FIG. 6.

As in the case of the wire 30a, the CPU 51 of the controller 50 calculates the difference Δdb between the image of the second-stage wire 32b and the third-stage wire 33b in one frame and the image of the second-stage wire 32b and the third-stage wire 33b in the previous frame as shown in the detail of the part B in FIG. 6. As shown in the detail of the part B in FIG. 6, this difference Δdb in the second-stage wire 32b and the third-stage wire 33b of the defective wire 30b is very large and exceeds a predetermined threshold ΔS. This difference Δdb is proportional to the amplitudes of the second-stage wire 32b and the third-stage wire 33b.

When the difference Δdb between the image of the second-stage wire 32b and the third-stage wire 33b in one frame and the image of the second-stage wire 32b and the third-stage wire 33b in the previous frame exceeds the predetermined threshold ΔS as shown in the detail of the part B in FIG. 6, the CPU 51 of the controller 50 determines the result as YES in step S105 of FIG. and proceeds to step S106 of FIG. 5, and outputs a wire defect detection signal indicating that there is a defect in the wire 30 of the semiconductor apparatus 10 to the outside.

On the other hand, if the difference Δd does not exceed the predetermined threshold ΔS in any of the wire 30, the CPU 51 of the controller 50 determines the result as NO in step S105 of FIG. 5 and proceeds to step S107 of FIG. 5, and outputs a wire defectless signal indicating that the wire 30 of the semiconductor apparatus 10 is defectless.

As illustrated above, the ultrasound vibrating-type defect detection apparatus 100 of the embodiment performs feedback control to keep the current A1 of the high-frequency power supplied from the high-frequency power supply 40 to the ultrasound vibrator 42 substantially constant, so that even if the frequency f of the high-frequency power is varied, the amplitude of the ultrasound vibrator 42 can be kept substantially constant and the amplitudes of the substrate 11 and the semiconductor element 20 can be kept substantially constant. Further, by adjusting the voltage so that the ratio of the amplitude of the wire 30 detected from the image captured by the camera 45 to the amplitudes of the substrate 11 and the semiconductor element 20 detected from the image captured by the camera 45 is equal to or greater than the predetermined value, the amplitude of the wire 30 can be prevented from being buried in the amplitudes of the substrate 11 and the semiconductor element 20. As a result, at various frequencies, the amplitude of the wire can be prevented from being buried in the amplitudes of the substrate 11 and the semiconductor element 20, and the amplitude of the wire 30 can be reliably detected at various frequencies.

In addition, the frequency at which the wire 30 vibrates greatly due to non-attachment of the wire 30 varies depending on the position of the non-attachment, the distances L between the electrodes 12 and 25 to 28, the diameter of the wire 30, and the like. Since the ultrasound vibrating-type defect detection apparatus 100 of the embodiment can reliably detect the amplitude of the wire 30 at various frequencies, the amplitude of the wire 30 can be detected at each frequency at which the amplitude of the wire 30 increases due to non-attachment, and a defect in the wire 30 can be detected with high accuracy in a short time.

In the above description, when varying the frequency f of the high-frequency power, the amplitude of the ultrasound vibrator 42 is kept substantially constant by performing feedback control to keep the current A1 of the high-frequency power supplied from the high-frequency power supply 40 to the ultrasound vibrator 42 substantially constant, but the present invention is not limited thereto.

Figure 7:
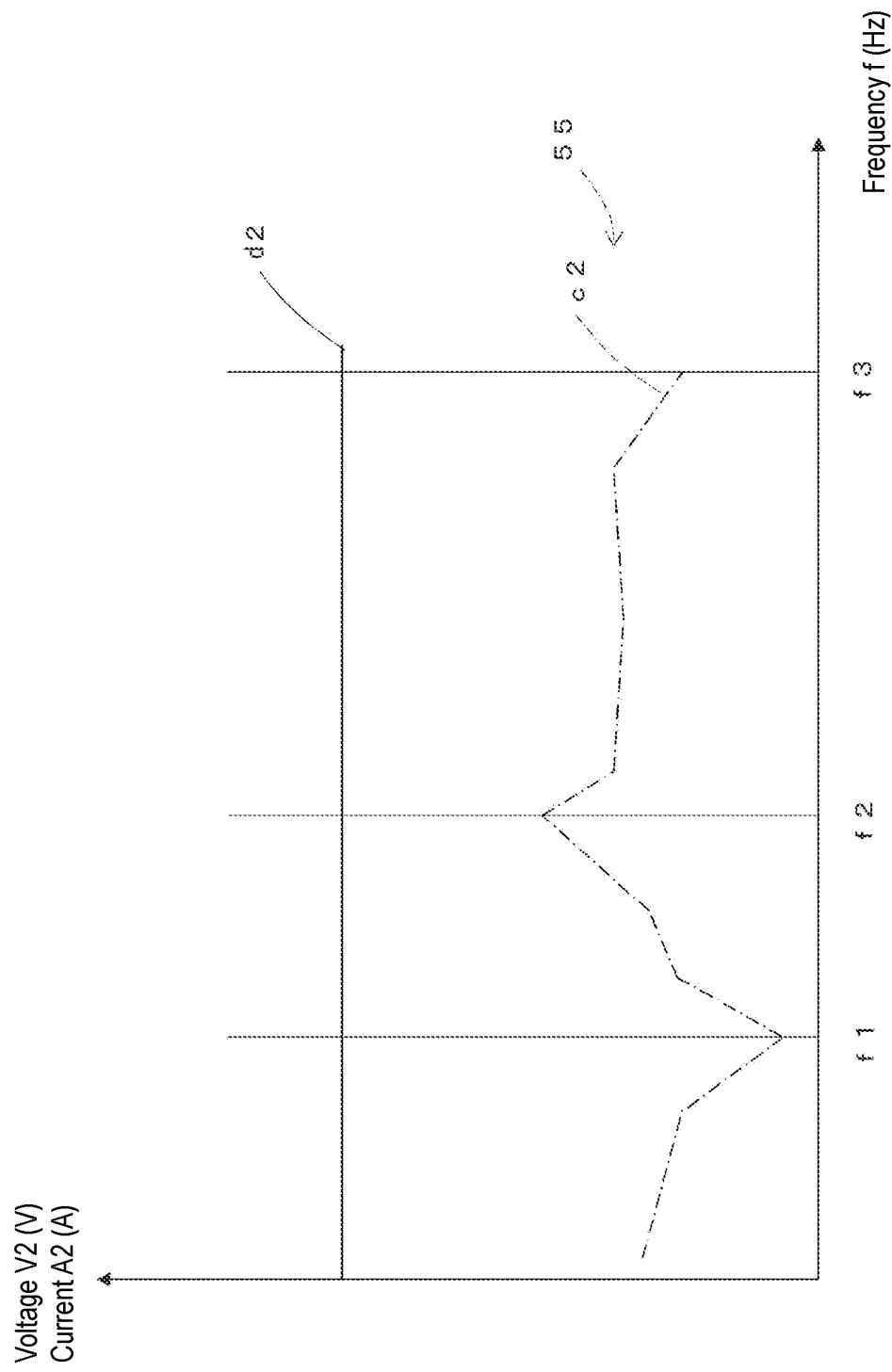
FIG. 7 is a diagram showing a map prescribing a variation of the voltage of the high-frequency power with respect to the frequency of the high-frequency power to keep the current of the high-frequency power supplied to the ultrasound vibrator constant in the ultrasound vibrating-type defect detection apparatus according to an embodiment.

For example, as described with reference to FIG. 3, a variation of the current A0 of the high-frequency power when the frequency is varied while the voltage V0 of the high-frequency power is kept constant is obtained by a test or the like, a voltage waveform is generated in which the increase and decrease of the current A0 are reversed as indicated by the one-dot chain line c2 in FIG. 7, and this voltage waveform is stored in the memory 52 as a map 55 that shows a variation of a voltage V2 with respect to the frequency f. As indicated by the one-dot chain line c2 in FIG. 7, the map 55 has a waveform in which the voltage is low in the vicinity of the frequency f1 and the voltage is high at the frequency f2. Then, when ultrasonic vibration is performed, the voltage for the frequency f may be adjusted by referring to the map 55 stored in the memory 52. In this case, as indicated by the solid line d2 in FIG. 7, the current A2 supplied to the ultrasound vibrator 42 is substantially constant even if the frequency varies.

As a result, when ultrasonically vibrating the semiconductor apparatus 10 in various frequency bands, it is possible to prevent the entire semiconductor apparatus 10 from vibrating greatly and prevent the amplitude of the wire 30, which is the target portion, from being hidden by the amplitude of the substrate 11 or the semiconductor element 20 and becoming undetectable with a simple configuration, and it is possible to detect a defect in the target portion of the inspection object with high accuracy.

Figure 8:
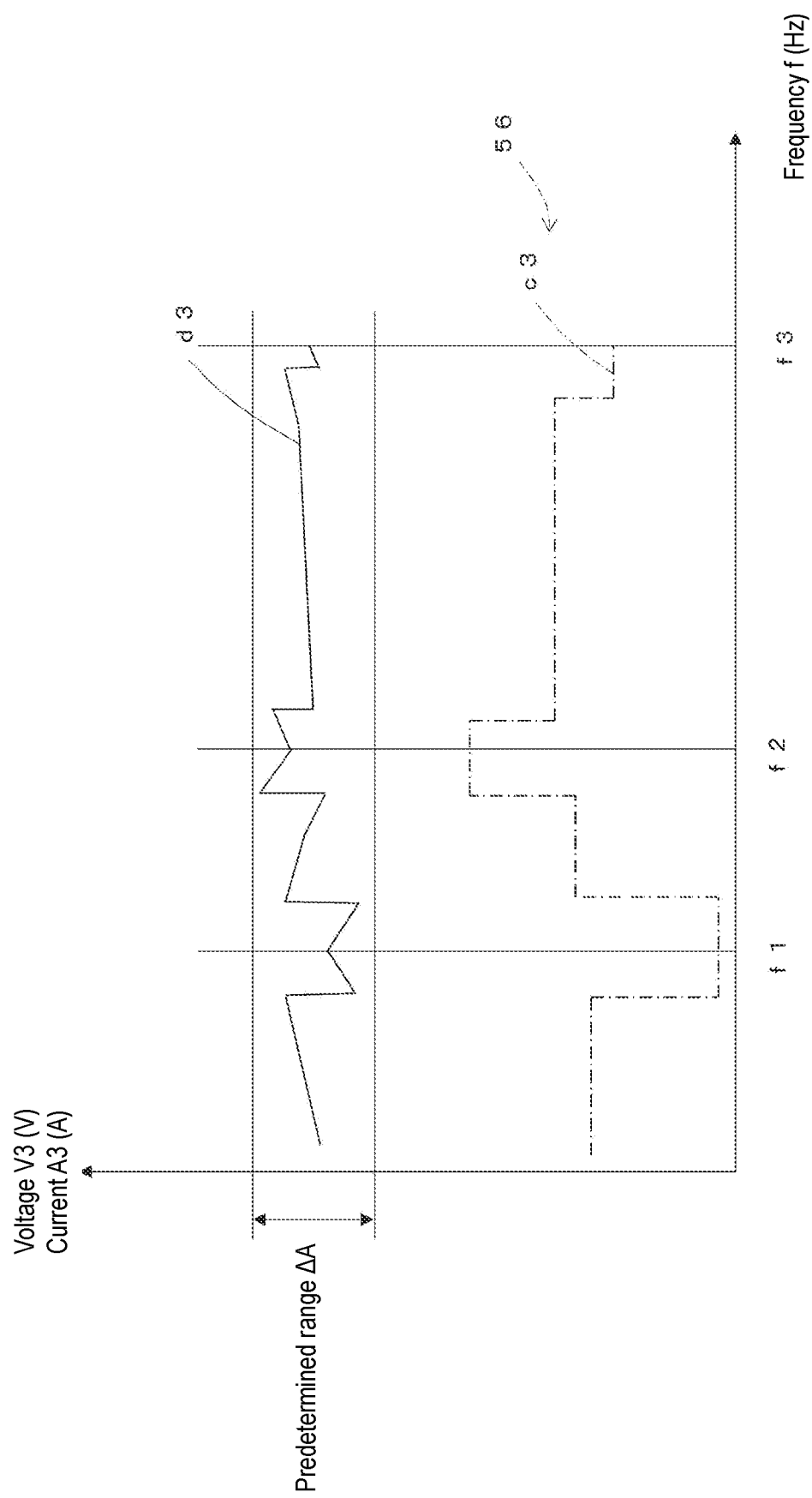
FIG. 8 is a diagram showing another map prescribing a variation of the voltage of the high-frequency power with respect to the frequency of the high-frequency power to keep the current of the high-frequency power supplied to the ultrasound vibrator within a predetermined range in the ultrasound vibrating-type defect detection apparatus according to an embodiment.

In addition, to simplify the test, for example, a voltage waveform for varying the voltage V3 stepwise with respect to the frequency f, as indicated by the one-dot chain line c3 in FIG. 8, may be stored in the memory 52 as a map 56. In this case, as indicated by the solid line d3 in FIG. 8, the current A3 supplied to the ultrasound vibrator 42 does not become substantially constant, but falls within a predetermined range AA. As a result, it is possible to detect a defect in the wire 30 with high accuracy in a short time by a simpler method.

Further, when ultrasonically vibrating the semiconductor apparatus 10, the CPU 51 of the controller 50 may calculate the difference $\Delta d$ between the images of the wire 30 by varying the number of frames between one frame for which the difference $\Delta d$ between the images of the wire 30 is to be calculated and the previous frame, or by varying the frame rate of the video. As a result, it is possible to detect the difference $\Delta d$ between the images of the wire 30 even when the vibration frequency of the wire 30 varies, and to improve the defect detection accuracy.

Figure 9:
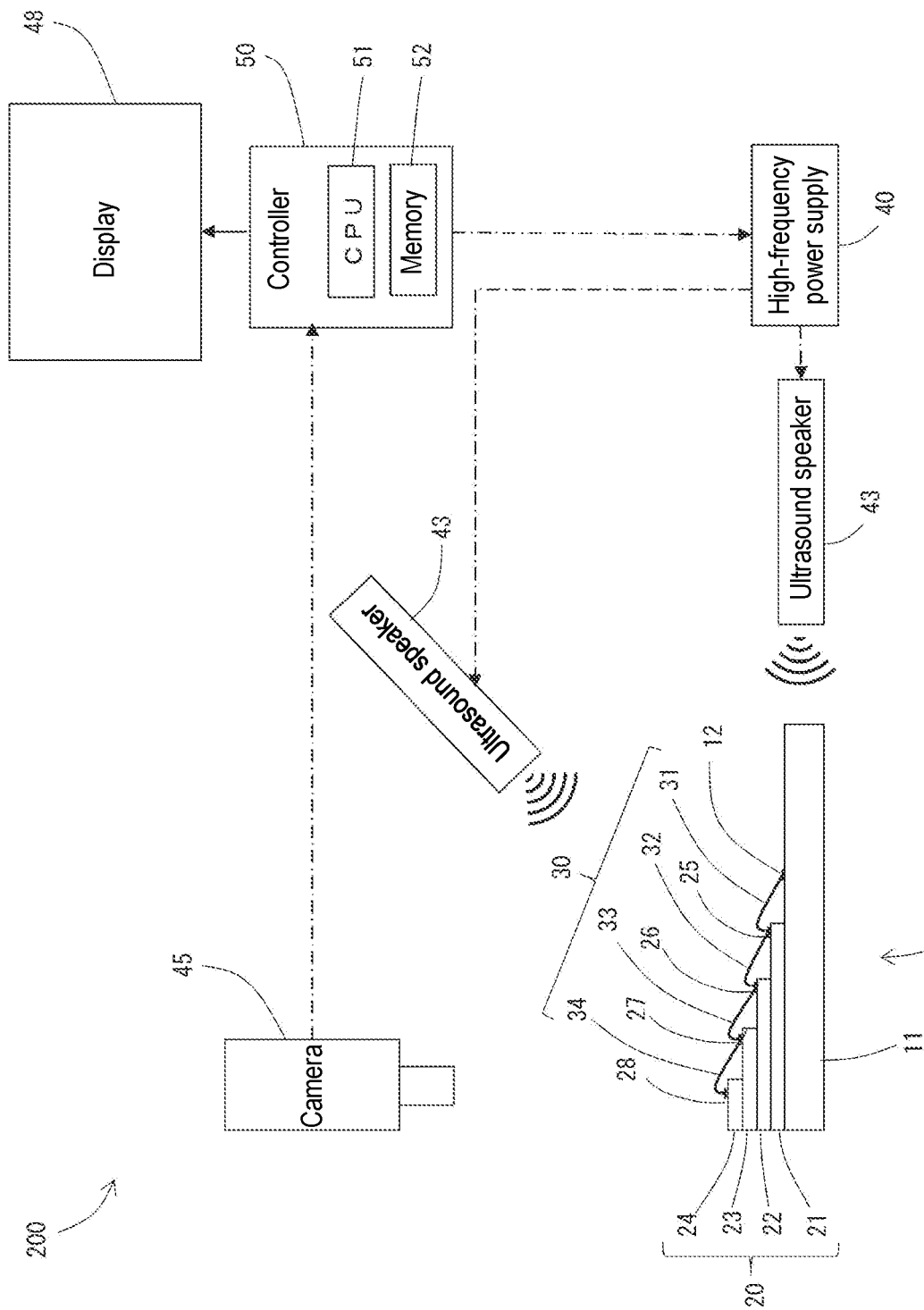
FIG. 9 is a system diagram showing a configuration of the wire defect detection system according to an embodiment.

Next, a wire defect detection system 200 according to an embodiment will be described with reference to FIG. 9. The wire defect detection system 200 shown in FIG. 9 detects a defect in a wire 30 of a semiconductor apparatus 10 that includes a substrate 11, semiconductor chips 21 to 24 attached to the substrate 11, and wires 31 to 34 connecting electrodes 25 to 28 of the semiconductor chips 21 to 24 and an electrode 12 of the substrate 11 or one of the electrodes 25 to 28 of the semiconductor chips 21 to 24 and others of the electrodes 25 to 28 of the semiconductor chips 21 to 24. The wire defect detection system 200 uses the ultrasound vibrator 42, which is the ultrasound vibrating device of the ultrasound vibrating-type defect detection apparatus 100 described above, as an ultrasound speaker 43, and has a display 48 for displaying the image captured by the camera 45 added to the controller 50. Further, the wire defect detection system 200 does not include the voltage sensor 53 and the current sensor 54 attached to the ultrasound vibrating-type defect detection apparatus 100, and the memory 52 of the controller 50 stores the map 55 or map 56 described with reference to FIG. 7 and FIG. 8. Then, when varying the frequency f of the high-frequency power supplied from the high-frequency power supply 40 to the ultrasound speaker 43, the CPU 51 of the controller 50 adjusts the voltage of the high-frequency power supplied from the high-frequency power supply 40 to the ultrasound speaker 43 based on the map 55 or map 56. Configurations other than the above are the same as those of the ultrasound vibrating-type defect detection apparatus 100 described above.

The ultrasound speaker 43 is arranged in the periphery of the semiconductor apparatus and ultrasonically vibrates the semiconductor apparatus 10.

An operation of the wire defect detection system 200 will be described with reference to FIG. 10 and FIG. 11. First, the same step numbers are assigned to the same operations as those of the ultrasound vibrating-type defect detection apparatus 100 described above with reference to FIG. 5 and FIG. 6, and the description thereof is omitted.

Figure 10:
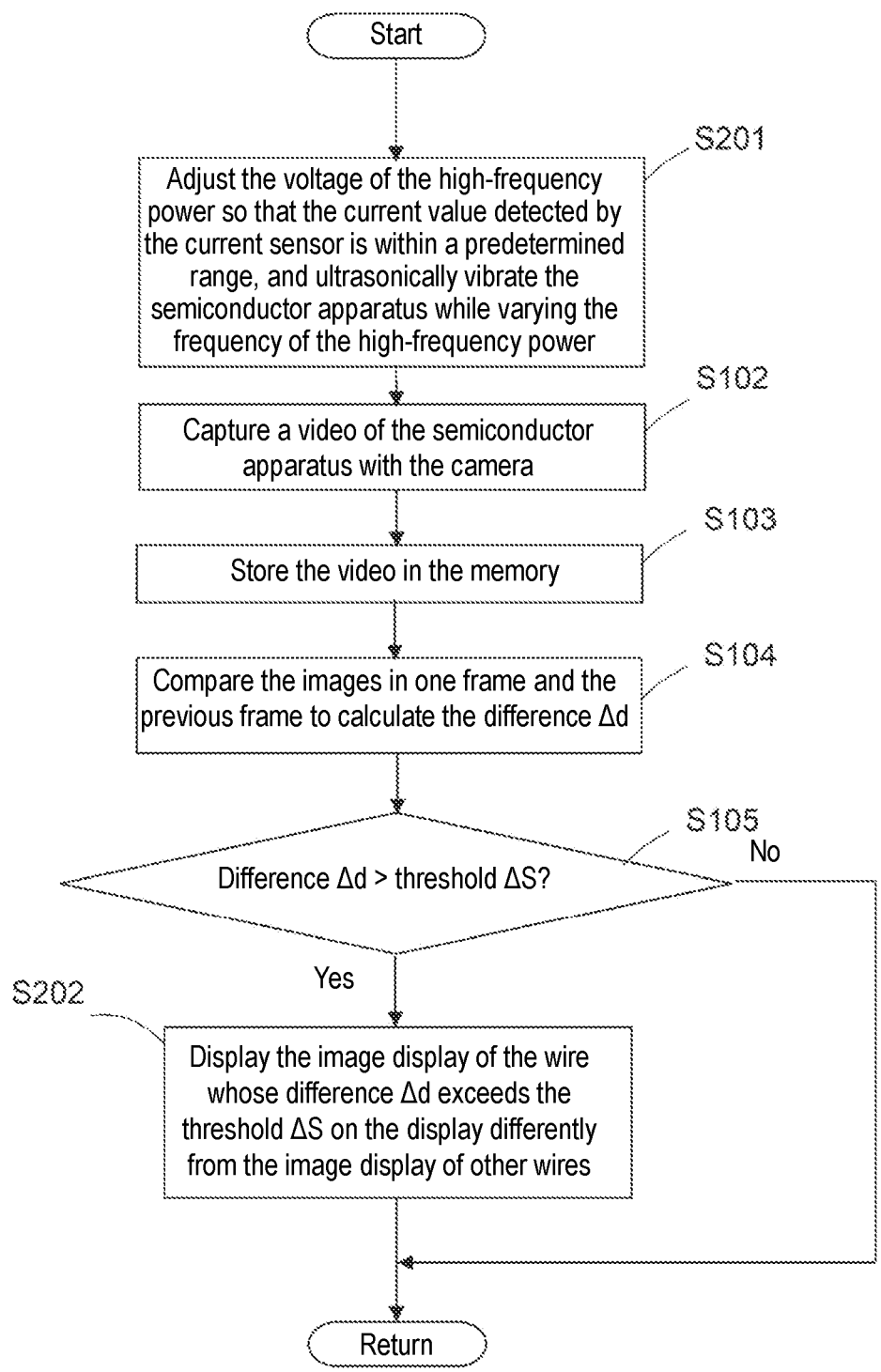
FIG. 10 is a flowchart showing an operation of the wire defect detection system shown in FIG. 9.

As shown in steps S201 and S102 to S104 of FIG. 10, the CPU 51 of the controller 50 adjusts the voltage V1 of the high-frequency power so that the current A1 detected by the current sensor 54 is substantially constant, and ultrasonically vibrates the semiconductor apparatus 10 while varying the frequency f of the high-frequency power. Then, the CPU 51 of the controller captures a video of the vibrating wire 30 of the semiconductor apparatus 10 and stores the captured image data in the memory 52. Then, the controller 50 varies the frequency of the high-frequency power within a predetermined ultrasonic frequency range, captures a video of the semiconductor apparatus 10, and stores the video in the memory 52, as described above, and then compares the images of one frame and the previous frame and calculates the difference $\Delta d$ between the images of the wire 30.

When the difference $\Delta db$ between the image of the second-stage wire 32b and the third-stage wire 33b in one frame and the image of the second-stage wire 32b and the third-stage wire 33b in the previous frame exceeds the predetermined threshold $\Delta S$ as shown in the detail of the part B in FIG. 6, the CPU 51 of the controller 50 determines the result as YES in step S105 of FIG. and proceeds to step S202 of FIG. 10, and makes the display image on the display 48 of the image of the second-stage wire 32b and the third-stage wire 33b different from the display image of the first-stage to fourth-stage wires 31a to 34a of the normally connected wire 30a.

There are various types of different displays, and for example, the image of the second-stage wire 32b and the third-stage wire 33b of the defective wire 30b may be displayed in red. In addition, it may be displayed in white with high brightness or may be displayed so as to be distinguishable from the image of the substrate 11 and the semiconductor chips 21 to 24 or the image of the first-stage to fourth-stage wires 31a to 34a of the normally connected wire 30a.

When the inspector sees the image on the display 48, for example, the defective wire 30b is displayed in red, so it is possible to detect whether there is a defective wire 30b and its position at a glance.

When the CPU 51 of the controller 50 determines the result as NO in step S105 of FIG. 10, the CPU 51 ends the process without changing the image.

Figure 11:
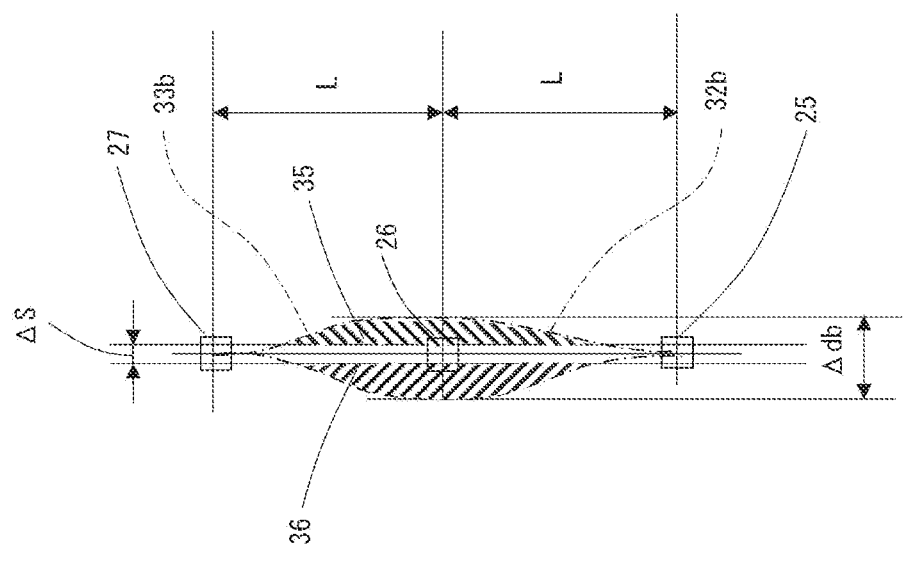
FIG. 11 is a plan view showing an excess area when the substrate is ultrasonically vibrated.

Further, as shown in FIG. 11, when the difference $\Delta db$ between the image of the second-stage wire 32b and the third-stage wire 33b in one frame and the image of the second-stage wire 32b and the third-stage wire 33b in the previous frame exceeds the predetermined threshold $\Delta S$, the CPU 51 of the controller 50 may make the image display of the excess areas 35 and 36 in which the difference $\Delta db$ in the vibration areas of the second-stage wire 32b and the third-stage wire 33b exceeds the predetermined threshold $\Delta S$ as shown by hatching in FIG. 11 different from the image display of the other areas, and display it on the display 48. For example, when the excess areas 35 and 36 are displayed in red, an area wider than the image of the second-stage wire 32b and the third-stage wire 33b of the defective wire 30b is displayed in red, so the inspector can more easily detect the defective wire 30b.

As illustrated above, in addition to the same effects as those of the ultrasound vibrating-type defect detection apparatus 100 described above, the wire defect detection system 200 of the embodiment can display the display image of the defective wire 30b on the display 48 by distinguishing it from other display images. As a result, the inspector can detect the defective wire 30b from the image on the display 48. Since the difference between the amplitude of the defective wire 30b and the amplitude of the normally connected wire 30a is remarkable, the defect in the defective wire 30b can be detected with high accuracy. In addition, since images of all the wires 30 included in the semiconductor apparatus 10 can be acquired by the camera 45, analyzed at the same time, and displayed on the display 48, even if the number of wires 30 increases, all the wires 30 can be inspected for defects in a short time.

What is claimed is:

1. An ultrasound vibrating-type defect detection apparatus for detecting a defect in an inspection object, the ultrasound vibrating-type defect detection apparatus comprising:
    an ultrasound vibrating device ultrasonically vibrating the inspection object;
    a power supply supplying high-frequency power to the ultrasound vibrating device;
    an imaging device imaging the inspection object ultrasonically vibrated; and
    a controller adjusting a frequency of the high-frequency power supplied from the power supply to the ultrasound vibrating device, and performing detection of a defect in the inspection object,
    wherein the controller captures an image of the inspection object with the imaging device while varying the frequency of the high-frequency power supplied from the power supply to the ultrasound vibrating device, and performs detection of a defect in the inspection object based on the image captured,
    the inspection object comprises a target portion subjected to detection of a defect, and a non-target portion not subjected to detection of a defect, and
    the controller adjusts a voltage of the high-frequency power supplied from the power supply to the ultrasound vibrating device so that a ratio of an amplitude of the target portion detected from the image captured by the imaging device to an amplitude of the non-target portion detected from the image captured by the imaging device is equal to or greater than a predetermined value when varying the frequency of the high-frequency power supplied from the power supply to the ultrasound vibrating device.

2. The ultrasound vibrating-type defect detection apparatus according to claim 1, comprising a current sensor detecting a current of the high-frequency power supplied from the power supply to the ultrasound vibrating device,
    wherein the controller adjusts the voltage of the high-frequency power supplied from the power supply to the ultrasound vibrating device so that the current detected by the current sensor is within a predetermined range when varying the frequency of the high-frequency power supplied from the power supply to the ultrasound vibrating device.

3. The ultrasound vibrating-type defect detection apparatus according to claim 1, wherein the controller comprises a map prescribing a variation of the voltage of the high-frequency power supplied from the power supply to the ultrasound vibrating device with respect to the frequency of the high-frequency power supplied from the power supply to the ultrasound vibrating device so that a current of the high-frequency power supplied from the power supply to the ultrasound vibrating device is within a predetermined range, and
    adjusts the voltage of the high-frequency power supplied from the power supply to the ultrasound vibrating device based on the map when varying the frequency of the high-frequency power supplied from the power supply to the ultrasound vibrating device.

4. The ultrasound vibrating-type defect detection apparatus according to claim 1, wherein the inspection object is a semiconductor apparatus comprising a substrate, a semiconductor element attached to the substrate, and a wire connecting an electrode of the semiconductor element and an electrode of the substrate, or one electrode of the semiconductor element and another electrode of the semiconductor element, and
    the controller adjusts the voltage of the high-frequency power supplied from the power supply to the ultrasound vibrating device so that a ratio of an amplitude of the wire detected from the image captured by the imaging device to amplitudes of the substrate and the semiconductor element detected from the image captured by the imaging device is equal to or greater than a predetermined value when varying the frequency of the high-frequency power supplied from the power supply to the ultrasound vibrating device.

5. The ultrasound vibrating-type defect detection apparatus according to claim 4, wherein the controller adjusts the voltage of the high-frequency power supplied from the power supply to the ultrasound vibrating device so that the amplitude of the wire detected does not exceed a predetermined upper limit amplitude.

6. The ultrasound vibrating-type defect detection apparatus according to claim 4, wherein the controller captures a video of the semiconductor apparatus with the imaging device while varying the frequency of the high-frequency power supplied from the power supply to the ultrasound vibrating device,
    calculates a difference between images of the wire in one frame of the video captured and a previous frame before the one frame, and
    outputs a defect detection signal of the wire in response to the difference exceeding a predetermined threshold.

7. The ultrasound vibrating-type defect detection apparatus according to claim 6, wherein the controller calculates the difference by varying the number of frames between one frame and the previous frame for calculating the difference, or a frame rate of the video.

8. The ultrasound vibrating-type defect detection apparatus according to claim 1, wherein the ultrasound vibrating device is an ultrasound vibrator connected to the inspection object to ultrasonically vibrate the inspection object, or an ultrasound speaker arranged in a periphery of the inspection object.

9. A wire defect detection system for detecting a defect in a wire of a semiconductor apparatus, which comprises a substrate, a semiconductor element attached to the substrate, and the wire connecting an electrode of the semiconductor element and an electrode of the substrate, or one electrode of the semiconductor element and another electrode of the semiconductor element, the wire defect detection system comprising:
    an ultrasound vibrating device ultrasonically vibrating the semiconductor apparatus;
    a power supply supplying high-frequency power to the ultrasound vibrating device;
    an imaging device imaging the semiconductor apparatus ultrasonically vibrated;
    a display displaying an image captured by the imaging device; and a controller adjusting a frequency of the high-frequency power supplied from the power supply to the ultrasound vibrating device and performing detection of a defect in the wire, wherein the controller captures a video of the semiconductor apparatus with the imaging device while varying the frequency of the high-frequency power supplied from the power supply to the ultrasound vibrating device, calculates a difference between images in one frame of the video captured and a previous frame before the one frame, and displays a display image of the wire on the display by differentiating the display image from other display images of the wire in response to the difference exceeding a predetermined threshold, the semiconductor apparatus comprises a target portion subjected to detection of a defect, and a non-target portion not subjected to detection of a defect, and the controller adjusts a voltage of the high-frequency power supplied from the power supply to the ultrasound vibrating device so that a ratio of an amplitude of the target portion detected from the image captured by the imaging device to an amplitude of the non-target portion detected from the image captured by the imaging device is equal to or greater than a predetermined value when varying the frequency of the high-frequency power supplied from the power supply to the ultrasound vibrating device.

10. The ultrasound vibrating-type defect detection apparatus according to claim 2, wherein the inspection object is a semiconductor apparatus comprising a substrate, a semiconductor element attached to the substrate, and a wire connecting an electrode of the semiconductor element and an electrode of the substrate, or one electrode of the semiconductor element and another electrode of the semiconductor element, and the controller adjusts the voltage of the high-frequency power supplied from the power supply to the ultrasound vibrating device so that a ratio of an amplitude of the wire detected from the image captured by the imaging device to amplitudes of the substrate and the semiconductor element detected from the image captured by the imaging device is equal to or greater than a predetermined value when varying the frequency of the high-frequency power supplied from the power supply to the ultrasound vibrating device.

11. The ultrasound vibrating-type defect detection apparatus according to claim 3, wherein the inspection object is a semiconductor apparatus comprising a substrate, a semiconductor element attached to the substrate, and a wire connecting an electrode of the semiconductor element and an electrode of the substrate, or one electrode of the semiconductor element and another electrode of the semiconductor element, and the controller adjusts the voltage of the high-frequency power supplied from the power supply to the ultrasound vibrating device so that a ratio of an amplitude of the wire detected from the image captured by the imaging device to amplitudes of the substrate and the semiconductor element detected from the image captured by the imaging device is equal to or greater than a predetermined value when varying the frequency of the high-frequency power supplied from the power supply to the ultrasound vibrating device.

12. The ultrasound vibrating-type defect detection apparatus according to claim 5, wherein the controller captures a video of the semiconductor apparatus with the imaging device while varying the frequency of the high-frequency power supplied from the power supply to the ultrasound vibrating device, calculates a difference between images of the wire in one frame of the video captured and a previous frame before the one frame, and outputs a defect detection signal of the wire in response to the difference exceeding a predetermined threshold.

13. The ultrasound vibrating-type defect detection apparatus according to claim 2, wherein the ultrasound vibrating device is an ultrasound vibrator connected to the inspection object to ultrasonically vibrate the inspection object, or an ultrasound speaker arranged in a periphery of the inspection object.

14. The ultrasound vibrating-type defect detection apparatus according to claim 3, wherein the ultrasound vibrating device is an ultrasound vibrator connected to the inspection object to ultrasonically vibrate the inspection object, or an ultrasound speaker arranged in a periphery of the inspection object.

* * * * *